(12) United States Patent
Kurozumi

(10) Patent No.: US 6,240,903 B1
(45) Date of Patent: Jun. 5, 2001

(54) WIRING ARRANGEMENT FOR ENGINE FUEL INJECTOR

(75) Inventor: Nobuo Kurozumi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/514,092

(22) Filed: Feb. 28, 2000

(30) Foreign Application Priority Data

Mar. 23, 1999 (JP) .................................................. 11-078330

(51) Int. Cl.⁷ ........................... F02B 77/00; F02M 51/00; H02G 3/00
(52) U.S. Cl. ................. 123/472; 123/195 C; 123/195 E; 174/72 A
(58) Field of Search .............................. 123/90.38, 143 C, 123/195 C, 195 E, 456, 470, 472; 174/72 A; 439/130

(56) References Cited

U.S. PATENT DOCUMENTS

| | | | |
|---|---|---|---|
| 5,353,758 | * 10/1994 | Masuda et al. | 123/143 C |
| 5,390,648 | * 2/1995 | Yanase | 123/634 |
| 5,568,794 | * 10/1996 | Tabuchi et al. | 123/195 E |
| 5,597,980 | * 1/1997 | Weber | 174/72 A |
| 5,642,704 | * 7/1997 | Gogots et al. | 123/198 R |
| 5,771,850 | * 6/1998 | Okada | 123/143 C |

FOREIGN PATENT DOCUMENTS

| | | |
|---|---|---|
| 3-260335 | 11/1991 | (JP) . |
| 9-144625 | * 6/1997 | (JP) . |

* cited by examiner

Primary Examiner—Tony M. Argenbright
(74) Attorney, Agent, or Firm—McCormick, Paulding & Huber LLP

(57) ABSTRACT

An injector harness arrangement for electric connection between an electronic control unit and a fuel injector located inside a head cover of the engine. The head cover is divided in its height direction, and the injector harness penetrates the head cover at an interface of upper and lower halves. Since the injector harness directly passes the head cover, the height of the head cover does not become high. Vibration from a cylinder head is attenuated by the lower half of the head cover and a gasket located between the cylinder head and the head cover lower half so that the interface between the upper and lower halves of the head cover does not vibrate very much. Therefore, high sealing quality is not required at the upper and lower half interface, to ensure air and oil tightness. In addition, the injector harness is not damaged by the vibration of the cylinder head.

16 Claims, 5 Drawing Sheets

WHEN VIEWED IN IV DIRECTION

10

WIRING ARRANGEMENT FOR ENGINE FUEL INJECTOR

BACKGROUND OF THE INVENTION

1. Field of the Invention

The present invention relates to an arrangement for coupling a harness between an electronic control unit located outside an engine and a fuel injector located inside the engine.

2. Description of the Related Art

A common rail-type fuel injection system for a diesel engine is generally equipped with an electronic control unit (ECU) for determining an amount and timing of fuel injection such that fuel injection matches an engine running condition. Specifically, ECU outputs an electric signal to an electromagnetic valve provided in a fuel injector such that the injector is activated to inject a desired amount of fuel to the engine at a desired timing.

ECU is coupled with the fuel injector by harness. This harness is referred to as injector harness in this specification. In general, ECU is mounted inside a passenger compartment or an engine room, which is outside the engine. The injector is attached to a cylinder head, and its connection to the harness is often located inside the engine (e.g., inside a head cover). In such an arrangement, the injector harness must penetrate the head cover.

Referring to FIG. 8 of the accompanying drawings, illustrated is one of known ways of passing the injector harness through the head cover. Specifically, a packing "c" provided between a cylinder head "a" and head cover "b" has through holes "d", which extend in the lateral direction, such that two injector harnesses (not shown) enter the cylinder head cover therethrough. This engine has four cylinders, and each of the two injector harnesses is used for each two of the four cylinders.

Referring next to FIG. 9 of the accompanying drawings, illustrated is another conventional way for passage of the injector harness (Japanese Patent Application Laid-Open Publication No. 3-260335). A terminal (connector) member "e" is embedded in a side wall of the head cover such that its front (or outer) face is exposed to the outside of the head cover and its back (or inner) face is exposed to the interior of the head cover. FIG. 9 illustrates the outer face. Wires are connected between the fuel injector and terminal "e" inside the head cover, and the harness extending from ECU is plugged into the terminal "e" outside the engine. The terminal "e" is fixed to the head cover side wall by bolts. Reference symbol "f" designates a flange having two bolt holes and "H" designates height of the flange.

However, the approach of FIG. 8 must employ a packing "c" of complicated shape. This would deteriorate air tightness and oil tightness at the packing "c". In particular, vibration from the cylinder head "a" is directly transmitted to the interface between the cylinder head "a" and head cover "b" so that high quality of sealing is required at the packing "c". Such requirements may not be met if the packing "c" has a complicated contour. Strong vibration is also transferred to the injector harness from the cylinder head "a" so that the injector harness may be damaged or disconnected.

The arrangement of FIG. 9 also has a shortcoming. Because the flange "f" has the bolt holes, its height "H" inherently becomes relatively large. As a result, the head cover also has large height. A tall head cover is not desirable if the engine should be designed to be compact.

SUMMARY OF THE INVENTION

An object of the present invention is to provide an injector harness arrangement that can overcome the above described problems associated with the conventional arrangements.

According to one aspect of the present invention, there is provided an injector harness arrangement for electric connection between an electronic control unit located outside an engine and a fuel injector located inside a head cover of the engine, characterized in that the head cover has a structure divisible in its height direction, and the injector harness penetrates the head cover an interface of upper and lower halves of the head cover. Since the injector harness directly passes the head cover, the height of the head cover does not become high. Vibration from a cylinder head is attenuated by the lower half of the head cover and a packing/gasket located between the cylinder head and head cover lower half so that the interface between the upper and lower halves of the head cover does not vibrate very much. Therefore, severe sealing quality is not required at the upper and lower half interface. In other words, simple sealing is sufficient to insure air tightness and oil tightness. In addition, the injector harness is not damaged by the vibration of the cylinder head.

Preferably, a grommet made from an elastic material is provided at the injector harness penetration portion of the head cover for sealing thereat. The injector harness passes through the grommet. The grommet may be supported by a bracket provided in the head cover for positioning of the injector harness. The bracket may engage with the grommet such that relative vibration between the bracket and grommet is absorbed by the grommet.

The present invention can demonstrate the following advantages:

(1) A sealing structure at the injector harness penetration portion of the head cover is simplified and damage of the harness is prevented; and (2) Head cover height is kept small. Thus, it is possible to design a compact engine.

Other advantages and objects of the present invention will become apparent to those skilled in the art when the following detailed description and appended claims are read and understood taken in conjunction with the accompanying drawings.

DETAILED DESCRIPTION OF THE INVENTION

Now, an embodiment of the present invention will be described in reference to the accompanying drawings.

Figure 1:
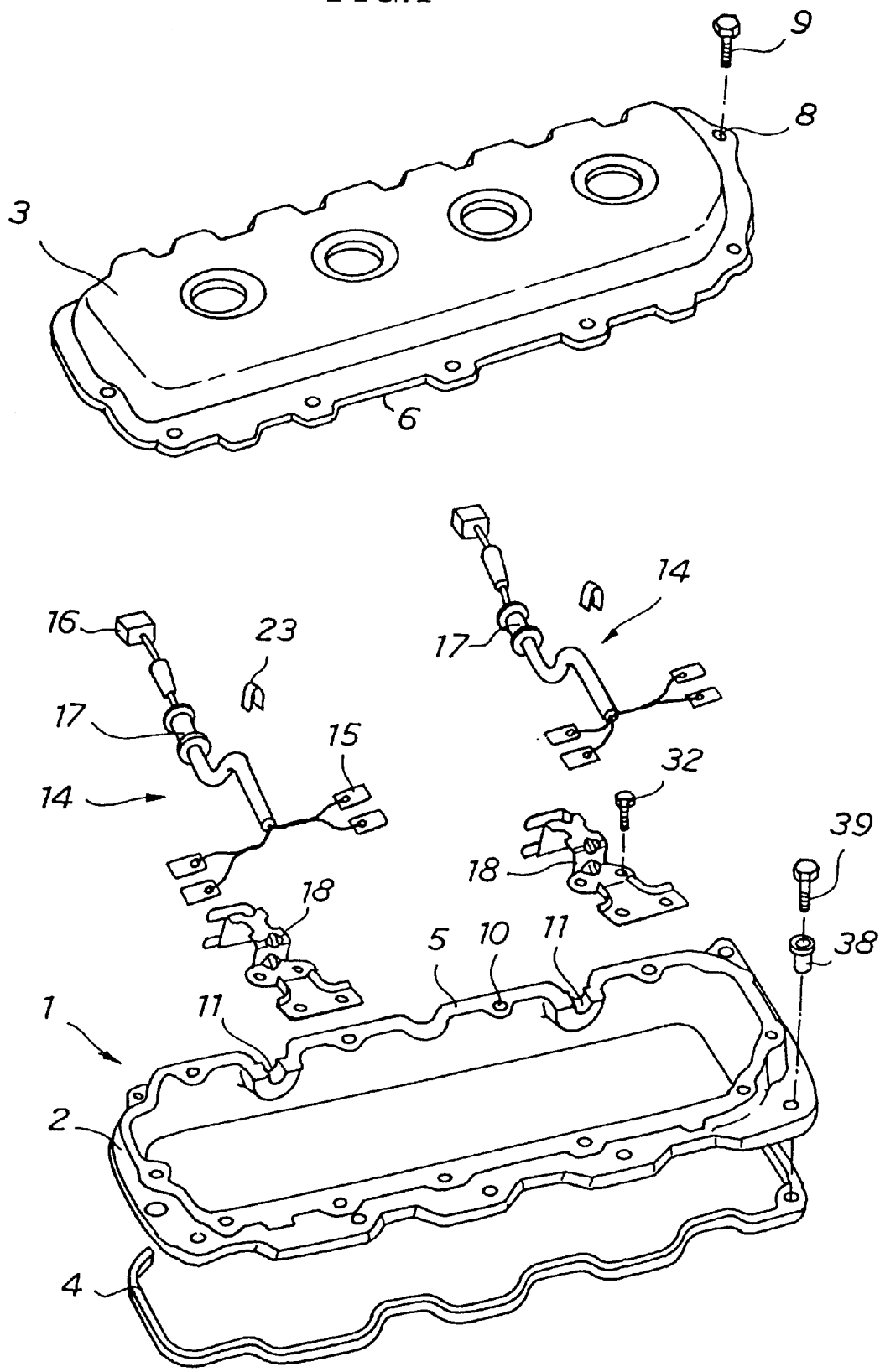
FIG. 1 illustrates an exploded perspective view of a harness arrangement according to the present invention.

Referring to FIG. 1, a head cover 1 is placed on a cylinder head (not shown) and fixed. This head cover 1 is divided into upper and lower halves 3 and 2. The head cover lower half 2 is secured to the cylinder head by bolts 39 with grommets 38. The grommets 38 are made from an elastic material such as rubber. A packing 4 made also from an elastic material such as rubber is provided between the head cover lower half 2 and cylinder head.

In this manner, the lower head cover segment 2 is secured on the cylinder head with the grommets 38 and packing 4 in a vibration attenuating condition. Therefore, vibration of the cylinder head is less transmitted to the lower head cover segment 2.

An upper edge of the lower head cover segment 2 and a lower edge of the upper head cover segment 3 have mating surfaces (or peripheries) 5 and 6 respectively. These mating peripheries 5 and 6 abut each other to form the single head cover 1.

Figure 2:
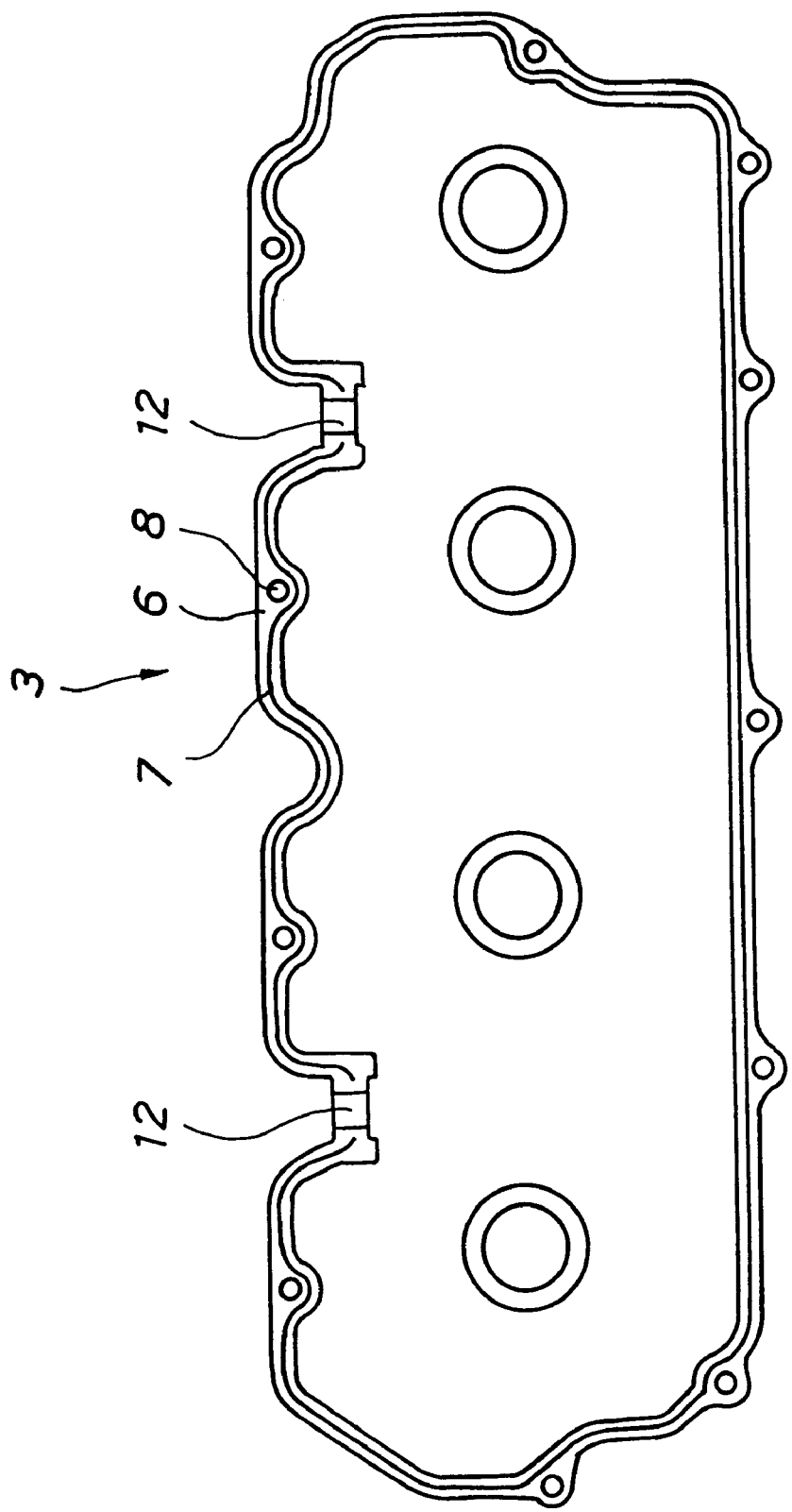
FIG. 2 illustrates a bottom view of an upper half segment of a head cover shown in FIG. 1.

Referring to FIG. 2, an upper packing 7 made from an elastic material such as rubber is attached to the periphery 6 of the upper head cover segment 3. Specifically, the upper packing 7 is fit in a groove formed in the periphery 6. Thus, the upper packing 7 is interposed between the lower head cover segment 2 and upper head cover segment 3 so that air tightness and oil tightness at the interface between the upper and lower head cover segments are insured, and transmission of vibration to the upper head cover segment is also suppressed. As shown in FIG. 1, a plurality of through holes 8 are formed in the flange 6 of the upper head cover segment 3 such that a plurality of bolts 9 pass these holes and are screwed into corresponding female threads 10 formed in the mating edge 5 of the lower head cover segment 2. In this manner, the upper head cover segment 3 is united to the lower head cover segment 2.

Figure 7:
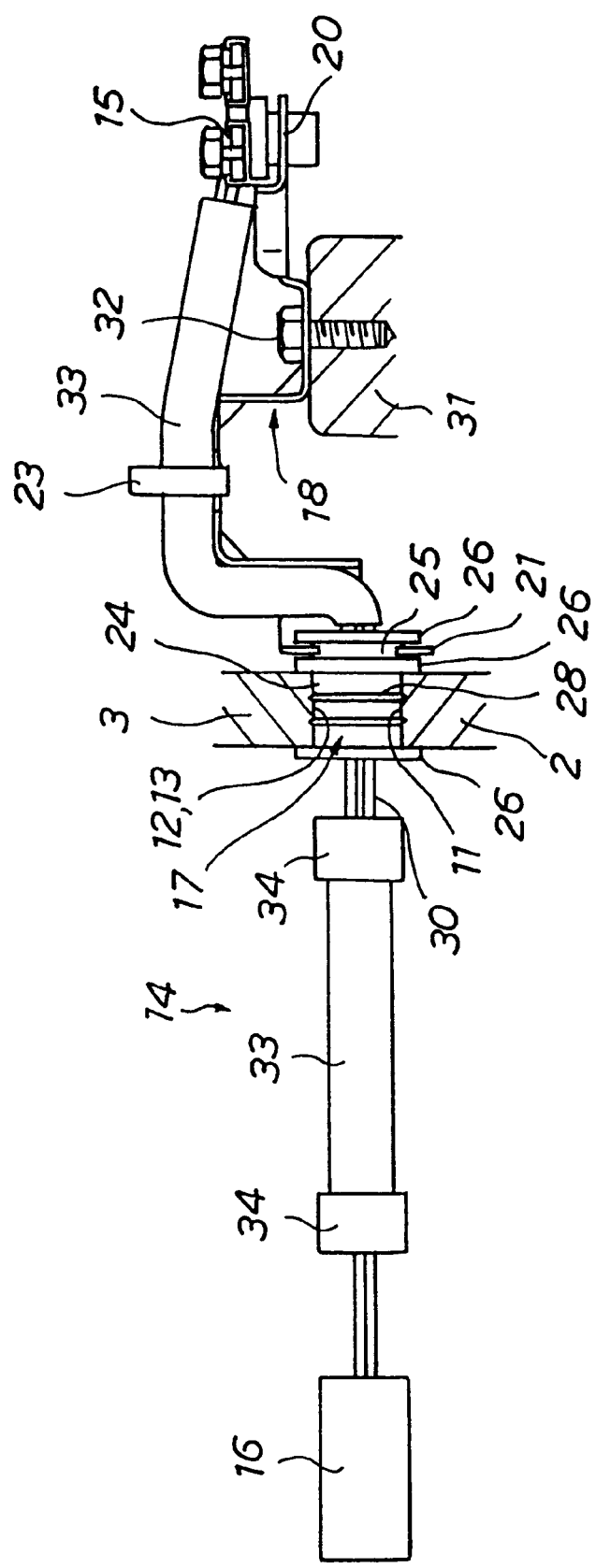
FIG. 7 illustrates a vertical cross sectional view of some elements of the harness arrangement shown in FIG. 1.
Figure 8:
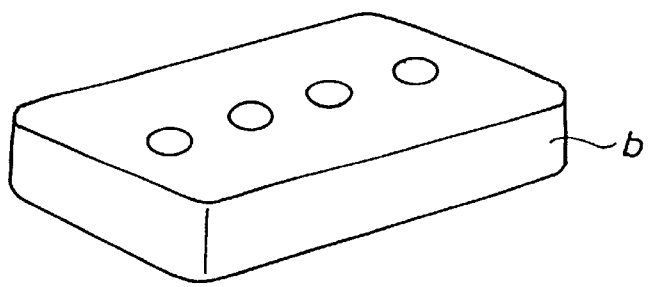
FIG. 8 illustrates an exploded perspective view of a conventional harness arrangement.
Figure 8:
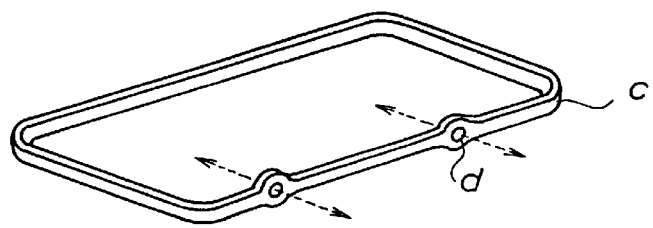
Figure 8:
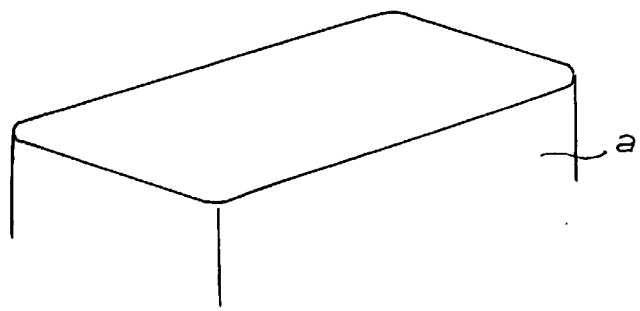
Figure 9:
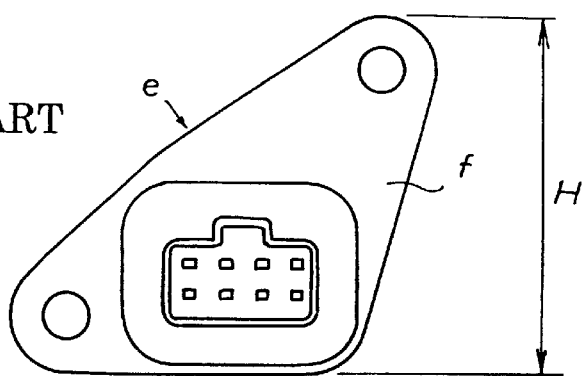
FIG. 9 illustrates a front view of a terminal provided at a harness penetration area according to another prior art.

As illustrated in FIG. 1, the lower head cover 2 has two semicircular cutouts or grooves 11 in the periphery 5, and as shown in FIG. 2, the upper head cover 3 has two mating cutouts 12 in the periphery 6. When the upper and lower head covers are united, these semicircular cutouts 11 and 12 form two through holes 13 (FIG. 7). Injector harnesses 14 pass these through holes 13. The two circular holes 13 are formed in the same side face of the head cover 1 and spaced in a longitudinal direction of the head cover 1.

Although not shown, four injectors are provided in the head cover 1. Each injector is associated with each cylinder of the engine. This engine has four cylinders. A lower part of each injector is buried in the cylinder head and an upper part is exposed. Each injector is mounted in a standing posture. A harness connection is provided at the upper part of each injector, and each harness connection (or each injector upper part) is electrically connected to ECU located outside the engine. The harnesses required for this electrical connection are illustrated at 14 in FIG. 1.

The four-cylinder engine needs two injector harness assemblies 14 in the illustrated embodiment. Each injector harness assembly 14 includes two terminals 15 at one end situated inside the engine and a joint connector 16 at the other end outside the engine. Each terminal 15 has small + and − plates. The two terminals 15 of each injector harness 14 are branched to the right and left inside the engine and connected to the two injectors. In this manner, one injector harness 14 is shared by two injectors so that the position of injector harness penetration is between adjacent two injectors. Each injector harness 14 is equipped with a grommet 17 made from an elastic material such as rubber. As illustrated in FIG. 7, each grommet 17 fits in the associated through hole 13 of the head cover 1 to seal between the through hole 13 and injector harness 14 and support the injector harness 14 in a vibration damping fashion. A bracket 18 is provided in the head cover 1 for each injector harness 14 such that it supports the injector harness 14 in position. Each bracket 18 also extends to the associated grommet 17 and engages. Inside the head cover 1, each injector harness 14 is fixed to the associated bracket 18 by a clip 23 and extends along the bracket.

Figure 3:
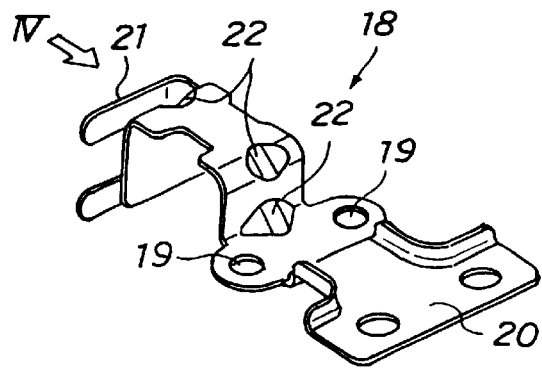
FIG. 3 illustrates a perspective view of a bracket employed in the harness arrangement shown in FIG. 1.
Figure 4:
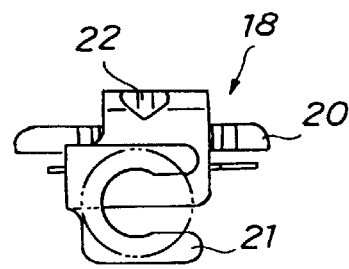
FIG. 4 illustrates another illustration of the bracket when viewed in the direction IV in FIG. 3.

Referring now to FIGS. 3 and 4, each bracket 18 is a one-piece element, which is made by, for example, pressing a metallic plate. Each bracket 18 has a pair of holes 19, through which bolts pass to fix the bracket 18 onto the cylinder head. Each bracket 18 also has an extension 20 to fix the terminals 15, a fork 21 to engage the grommet 17, and a series of recesses 22 to support the injector harness 14 along the center line of the bracket 18.

Figure 5:
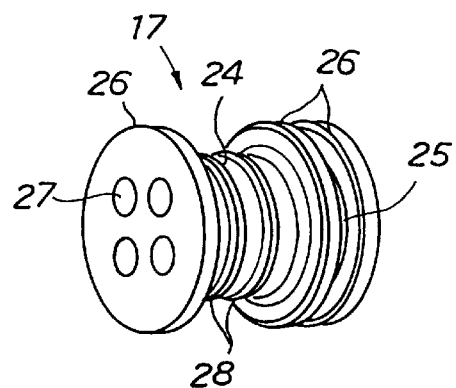
FIG. 5 illustrates a perspective view of a grommet.
Figure 6:
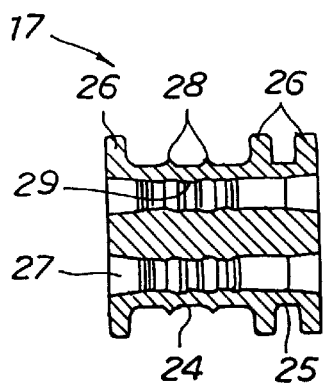
FIG. 6 illustrates a vertical cross sectional view of the grommet shown in FIG. 5.

Referring to FIGS. 5 and 6, each grommet 17 includes an engagement portion 24 that engages the grooves 11 and 12 of the lower and upper head covers 2 and 3 (or the through hole 13). Each grommet 17 also includes another engagement portion 25 that engages the fork 21 of the bracket 18 when the fork 12 is thrust in from the lateral direction, and four holes 27 for passage of core wires of the injector harness 14. The center engagement portion 24 and endwise engagement portion 25 are separated and defined in a longitudinal direction of the grommet by flanges 26. The center engagement portion 24 has projections 28 on its outer surface and the core wire holes 27 have projections 29 on their inner walls to raise sealing (or contact) pressure between the grommet 17 and the head cover hole 13 and between the core wires and the holes 27 respectively.

Referring to FIG. 7, illustrated is the harness assembly 14 after the head cover 1 is mounted on the cylinder head. The harness assembly 14 includes four core wires 30, i.e., two pairs of + and − core wires. These core wires 30 are bundled by corrugated tubes 33 and tapes 34. The core wires 30 extend through the grommet holes 27 at the approximate mid-point of the harness assembly 14. Passage of the core wires 30 through the grommet holes 27 are relatively tight so that proper sealing is insured. The bracket 18 is secured onto a boss 31 formed on the cylinder head by screwing bolts 32 into the holes 19 (FIG. 3).

The fork 21 of the bracket 18 engages over the engagement portion 25 of the grommet 17 so that the grommet 17 is supported by the bracket 18 inside the head cover 1. The injector harness 14 extends along the bracket 18 inside the head cover 1. The clip 23 holds the injector harness 14 together with the bracket 18. Since the injector harness 14 is guided by a series of recesses 22 of the bracket 18 (FIG. 3), it can bend neatly along the contour of the bracket 18 even at right angle corners of the bracket. The terminals 15 of the injector harness 14 are fixed to the extension 20 of the bracket 18.

Outside the head cover 1, an approximate half of the injector harness 14 extends. The connector 16 at the end of the injector harness 14 is now ready to couple to another harness extending from ECU.

At the injector harness penetration portion of the head cover 1, the engagement portion 24 of the grommet 17 is rigidly supported by the hole 13 of the head cover 1. The engagement portion 24, particularly its projections 28 firmly contact (or pressed against) the head cover hole 13 so that appropriate sealing along the outer periphery of the engagement portion 24 can be expected. The flanges 26 at both ends of the engagement portion 24 firmly attach to the inner and outer faces of the head cover side wall so that the sealing is further enhanced. Because the flanges 26 are provided, no problem would occur at interrupted portions of the upper packing 7 near the grooves 12 (FIG. 2).

In the present invention, the injector harness 14 directly penetrates the head cover 1 so that unlike the conventional arrangement it is not necessary to mount a terminal with a flange for passage of the injector harness. Accordingly, the height of the head cover 1 does not become large. This makes it possible to design a compact engine.

Further, the lower head cover 2 and associated packing 4 attenuate the vibration transmitted from the cylinder head so that the interface between the upper and lower head covers does not vibrate very much. Consequently, severe sealing quality is not required to the upper and lower head cover interface as compared with the cylinder head-lower head cover interface. In other words, a simple and inexpensive seal or packing is sufficient to ensure air tightness and oil tightness at the upper and lower head cover interface. Damage and disconnection of the injector harnesses 30 are also prevented since the vibration from the cylinder head is absorbed at the cylinder head-lower head cover interface. The grommets 17 can have a simple structure to provide suitable sealing and vibration damping since less vibration is transmitted to the grommets 17. Diameter of the grommet 17 is only slightly greater than a diameter of the harness so that height of the head cover 1 does not become large. In the present invention, a complicated packing is not needed for passage of the injector harness unlike the conventional arrangement.

The grommets 17 are buried in the head cover wall whereas the brackets 18 are mounted on the cylinder head. Therefore, there is some discrepancy between vibration of the grommets 17 and that of the brackets 18. If the grommets 17 were completely separated and independent from the brackets 18, this relative vibration discrepancy would be born by the injector harnesses 14. As a result, the injector harnesses 14 would be damaged. In the illustrated embodiment, however, part of each bracket 18 engages with the associated grommet 17 so that the relative vibration between the grommet and bracket is absorbed by the grommet 17 and not born by the harness. Therefore, damage of the injector harness is prevented.

In addition to or instead of engagement between the grommet and bracket, the clip 23 and/or extension 20 may be used to physically connect the bracket 18 to the harness. If this connection is done before installation of the harness, it facilitates assembling of the harness to the cylinder head. If the bracket 18 were first mounted on the engine and the harness were then mounted to the bracket 18, only a small space is left for a service man to place the grommet 17 and secure the terminal 15 in the lower head cover 2. This would be troublesome. As mentioned above, by mounting the bracket 18 to the harness beforehand, what the service man should do is simply placing the grommet 17 in the groove 11 of the lower head cover 2 and tightening the bolts 32. This greatly facilitates the work.

In addition, inspection and maintenance of the engine is facilitated since the head cover 1 is divisible to upper and lower segments.

It should be noted that the present invention is not limited to the above described embodiment. Teaching of the present invention is applicable to a diesel engine and gasoline engine equipped with an electronically controlled fuel injection system.

The illustrated and described harness arrangement for a fuel injector is disclosed in Japanese Patent Application No. 11-78330 filed on Mar. 23, 1999, the instant application claims priority of this Japanese Patent Application, and the entire disclosure thereof is incorporated herein by reference.

What is claimed is:

1. An injector harness arrangement for connecting an electronic control unit located outside an engine and a fuel injector located inside a head cover of the engine by an injector harness, comprising:

an upper head cover segment;

a lower head cover segment to be united with the upper head cover segment thereby forming the head cover; and the injector harness extending through an interface between the upper and lower head cover segments.

2. The injector harness arrangement according to claim 1 further including a grommet provided at the interface between the upper and lower head cover segments such that the injector harness extends through the grommet when it penetrates through the head cover.

3. The injector harness arrangement according to claim 1 further including a bracket attached to a cylinder head inside the head cover to support the injector harness inside the head cover.

4. The injector harness arrangement according to claim 2 further including a bracket attached to a cylinder head inside the head cover to support the injector harness inside the head cover.

5. The injector harness arrangement according to claim 4, wherein the grommet is made from an elastic material.

6. The injector harness arrangement according to claim 5 further including means provided between the lower head cover segment and a cylinder head for absorbing vibration transmitted to the lower head cover segment from the cylinder head.

7. The injector harness arrangement according to claim 6 further including a packing provided between the upper and lower head cover segments for absorbing vibration transmitted to the upper head cover segment from the lower head cover segment.

8. The injector harness arrangement according to claim 7, wherein the upper head cover segment has a cutout and the lower head cover segment has a mating cutout such that these two cutouts form a hole when the upper and lower head cover segments are united, and the injector harness passes through the hole.

9. The injector harness arrangement according to claim 3, wherein the bracket has a series of recesses to hold the injector harness such that the injector harness extends along the bracket.

10. The injector harness arrangement according to claim 8, wherein the bracket has a series of recesses to hold the injector harness such that the injector harness extends along the bracket.

11. The injector harness arrangement according to claim 5, wherein the bracket engages with the grommet such that relative vibration between the bracket and grommet is absorbed by the grommet.

12. The injector harness arrangement according to claim 10, wherein the bracket engages with the grommet such that relative vibration between the bracket and grommet is absorbed by the grommet.

13. The injector harness arrangement according to claim 12, wherein the grommet has a first set of projections on its outer surface and a second set of projections on its inner surface such that the first set of projections are pressed against the hole of the head cover and the second set of projections are pressed against the injector harness when the grommet fits in the hole of the head cover and the injector harness passes through the grommet.

14. The injector harness arrangement according to claim 2, wherein the grommet has a first set of projections on its outer surface and a second set of projections on its inner surface.

15. The injector harness arrangement according to claim 13, wherein the grommet has flanges at both ends thereof for closing the hole of the head cover, the flanges having a diameter larger than the grommet.

16. The injector harness arrangement according to claim 2, wherein the grommet is slightly larger than the injector harness whereby the head cover does not become tall.

* * * * *